United States Patent
Vellozo Luz et al.

(10) Patent No.: US 10,817,842 B2
(45) Date of Patent: Oct. 27, 2020

(54) SYSTEMS AND METHODS FOR PROVIDING A COLLECTIVE POST

(71) Applicant: RedDrummer LLC, New York, NY (US)

(72) Inventors: Andre Gustavo Vellozo Luz, New York, NY (US); Alberto Fernando Blumenschein Cruz, Sao Paulo (BR)

(73) Assignee: Drumwave Inc., Palo Alto, CA (US)

( * ) Notice: Subject to any disclaimer, the term of this patent is extended or adjusted under 35 U.S.C. 154(b) by 0 days.

(21) Appl. No.: 14/472,603

(22) Filed: Aug. 29, 2014

(65) Prior Publication Data
US 2015/0067058 A1 Mar. 5, 2015

Related U.S. Application Data

(60) Provisional application No. 61/872,620, filed on Aug. 30, 2013.

(51) Int. Cl.
*G06F 15/16* (2006.01)
*G06Q 10/10* (2012.01)
(Continued)

(52) U.S. Cl.
CPC ......... *G06Q 10/103* (2013.01); *G06F 3/0481* (2013.01); *G06F 3/0484* (2013.01);
(Continued)

(58) Field of Classification Search
CPC ... G06Q 10/103; G06F 3/0481; G06F 3/0484; H04L 51/32; H04L 67/14; H04L 51/20; H04L 29/06401
(Continued)

(56) References Cited

U.S. PATENT DOCUMENTS 694,220 A 2/1902 Webster
6,088,702 A * 7/2000 Plantz ..................... G06F 17/24
(Continued)

FOREIGN PATENT DOCUMENTS

FR 2835335 8/2003

OTHER PUBLICATIONS

Hofte et al., "CoCoDoc: a framework for collaborative compound document editing based on OpenDoc and CORBA," Proceedings of the IFIP/IEEE International Conference on Open Distributed Processing and Distributed Platforms (May 26-30, 1997), Toronto, Canada.

(Continued)

*Primary Examiner* — Kaylee J Huang
(74) *Attorney, Agent, or Firm* — Troutman Pepper Hamilton Sanders LLP

(57) ABSTRACT

Methods, systems, and computer program code for producing a collective post are disclosed. A system for producing a collective post may include a processing device and a non-transitory, processor-readable storage medium in communication with the processing device. The non-transitory, processor-readable storage medium may include one or more programming instructions that, when executed, cause the processing device to receive at least one input from each of a plurality of users, direct a storage device to store data corresponding to the at least one input, receive an instruction from at least one of the plurality of users, and publish the collective post to the collaborative networking platform as a collective post entry. The at least one input may correspond to one or more interactions between each user and a collective desktop. The instruction may include a command to compile the data into the collective post.

13 Claims, 9 Drawing Sheets

(51) Int. Cl.

| | |
|---|---|
| *H04L 12/58* | (2006.01) |
| *H04L 29/08* | (2006.01) |
| *G06F 3/0488* | (2013.01) |
| *G06F 3/0481* | (2013.01) |
| *G06F 3/0484* | (2013.01) |
| *H04M 1/725* | (2006.01) |

(52) U.S. Cl.
CPC .......... *G06F 3/04886* (2013.01); *H04L 51/32* (2013.01); *H04L 67/14* (2013.01); *H04M 1/72552* (2013.01)

(58) Field of Classification Search
USPC ................................ 709/204, 205, 217, 232
See application file for complete search history.

(56) References Cited

U.S. PATENT DOCUMENTS

| | | | |
|---|---|---|---|
| 6,601,087 B1 | 7/2003 | Zhu et al. | |
| 6,701,345 B1 | 3/2004 | Carley et al. | |
| 7,130,879 B1* | 10/2006 | Dayon ................... | G06Q 10/10 709/203 |
| 7,694,220 B2 | 4/2010 | Kawano | |
| 8,125,510 B2 | 2/2012 | Agarwal et al. | |
| 8,443,005 B1 | 5/2013 | Goldman et al. | |
| 9,031,888 B2 | 5/2015 | Lawrence et al. | |
| 2004/0210550 A1 | 10/2004 | Williams et al. | |
| 2006/0106847 A1 | 5/2006 | Eckardt, III et al. | |
| 2006/0122974 A1 | 6/2006 | Perisic | |
| 2006/0143081 A1 | 6/2006 | Argaiz | |
| 2006/0282303 A1 | 12/2006 | Hale et al. | |
| 2007/0064004 A1* | 3/2007 | Bonner ............... | G06F 3/04883 345/442 |
| 2007/0214137 A1 | 9/2007 | Gloor | |
| 2007/0294125 A1 | 12/2007 | Thomsen | |
| 2008/0070209 A1 | 3/2008 | Zhuange et al. | |
| 2009/0067350 A1* | 3/2009 | Stalnacke ............... | H04L 12/66 370/260 |
| 2009/0094233 A1 | 4/2009 | Marvit et al. | |
| 2009/0164926 A1 | 6/2009 | Boyle et al. | |
| 2010/0070448 A1 | 3/2010 | Omoigui | |
| 2010/0138746 A1 | 6/2010 | Zarom | |
| 2010/0145771 A1 | 6/2010 | Fligler et al. | |
| 2010/0205190 A1* | 8/2010 | Morris .................... | G06F 3/041 707/758 |
| 2011/0161824 A1* | 6/2011 | Coldefy ................ | G06F 3/0481 715/735 |
| 2011/0167115 A1 | 7/2011 | Gilbert et al. | |
| 2011/0196670 A1 | 8/2011 | Dang et al. | |
| 2011/0239129 A1* | 9/2011 | Kummerfeld ......... | G06F 3/0488 715/750 |
| 2011/0252312 A1* | 10/2011 | Lemonik ............... | G06F 17/248 715/255 |
| 2011/0320542 A1 | 12/2011 | Bendel et al. | |
| 2011/0320961 A1 | 12/2011 | Sriraghavan et al. | |
| 2012/0059713 A1 | 3/2012 | Galas et al. | |
| 2012/0072496 A1* | 3/2012 | Wang ................ | G06F 17/30882 709/204 |
| 2012/0179752 A1 | 7/2012 | Mosley et al. | |
| 2012/0209918 A1 | 8/2012 | Shah et al. | |
| 2012/0215604 A1 | 8/2012 | Canetto | |
| 2012/0227044 A1 | 9/2012 | Arumugham et al. | |
| 2012/0233555 A1 | 9/2012 | Psistakis et al. | |
| 2012/0272261 A1* | 10/2012 | Reynolds ............. | H04N 21/222 725/30 |
| 2012/0290950 A1 | 11/2012 | Rapaport et al. | |
| 2012/0304260 A1* | 11/2012 | Steeves ................... | G06F 21/31 726/5 |
| 2012/0311448 A1* | 12/2012 | Achour ................ | G06Q 10/101 715/723 |
| 2013/0027428 A1* | 1/2013 | Graham ................. | H04L 51/32 345/633 |
| 2013/0030887 A1 | 1/2013 | Calman et al. | |
| 2013/0041860 A1 | 2/2013 | Lawrence et al. | |
| 2013/0054326 A1 | 2/2013 | Ross et al. | |
| 2013/0091205 A1* | 4/2013 | Kotler ................. | H04L 65/4015 709/204 |
| 2013/0155009 A1 | 6/2013 | Sevigny | |
| 2013/0159708 A1* | 6/2013 | Miller ..................... | G06F 17/24 713/165 |
| 2013/0238416 A1 | 9/2013 | Richard | |
| 2013/0282440 A1 | 10/2013 | Isaac | |
| 2013/0326607 A1* | 12/2013 | Feng ....................... | H04L 63/10 726/7 |
| 2013/0346147 A1 | 12/2013 | Vellozo Luz et al. | |
| 2014/0019447 A1 | 1/2014 | Goryavskiy et al. | |
| 2014/0280740 A1* | 9/2014 | Alley ................ | H04L 29/08072 709/219 |

OTHER PUBLICATIONS

Matzinger, "An Open Source Collaboration Framework with Inter-Desktop Movable Windows and Remote Multicursor Desktops." 2011, COLLA 2011: *The First International Conference on Advanced Collaborative Networks, Systems and Applications*, Luxembourg City, Luxembourg, Jun. 19, 2011 through Jun. 24, 2011.

Mazalek et al., "TViews: An Extensible Architecture for Multiuser Digital Media Tables," *IEEE Computer Graphics and Applications*, Sep./Oct. 2006, pp. 47-55.

Tang et al., "VideoDraw: A Video Interface for Collaborative Drawing," *ACM Transactions on Information Systems*, 9(2):170-184 (Apr. 1991).

Tran et al., Split Window View and Modification Director: Innovative Awareness Mechanisms in Real-time Collaborative Writing, *Proceedings of HF*, (Nov. 25-27, 2002) Melbourne, Australia, 8 pp. http://www.ozchi.org/proceedings/2002/Ppapers/Paper%2065%20Minh%20Hong%20Tran.pdf.

Gurrin et al. "Replicating Web Structure in Small-Scale Test Collections" Sep.-Dec. 2004, *Information Retrieval* 7:239-263.

* cited by examiner

SYSTEMS AND METHODS FOR PROVIDING A COLLECTIVE POST

CROSS-REFERENCE TO RELATED APPLICATION

This application claims the priority benefit of U.S. Provisional Patent Application No. 61/872,620, filed Aug. 30, 2013 and entitled "Systems and Methods for Providing a Collective Post," which is incorporated herein by reference in its entirety.

BACKGROUND

Organizations frequently seek methods and systems that are effective in increasing productivity in the work environment, particularly as it relates to collaborative efforts among employees. Some organizations have turned to a system including collaborative networking in an effort to allow employees to co-operate by posting information to a centralized site for all other employees to view, comment, edit, and/or the like.

However, some difficulty exists in instances where it may be desirable to allow a group of employees to collectively post as a whole to a collaborative networking platform, particularly as it pertains to a collaborative effort to produce a post for other employees and/or groups within the organization to view, comment, edit, and/or the like.

SUMMARY

In an embodiment, a system for producing a collective post may include a processing device and a non-transitory, processor-readable storage medium in communication with the processing device. The non-transitory, processor-readable storage medium may include one or more programming instructions that, when executed, cause the processing device to receive at least one input from each of a plurality of users, direct a storage device to store data corresponding to the at least one input, receive an instruction from at least one of the plurality of users, and publish the collective post to the collaborative networking platform as a collective post entry. The at least one input may correspond to one or more interactions between each user and a collective desktop. The instruction may include a command to compile the data into the collective post.

In an embodiment, a method for producing a collective post may include receiving, by a processing device, at least one input from each of a plurality of users, directing, by the processing device, a storage device to store data corresponding to the at least one input, receiving, by the processing device, an instruction from at least one of the plurality of users, and publishing, by the processing device, the collective post to the collaborative networking platform as a collective post entry. The at least one input may correspond to one or more interactions between each user and a collective desktop. The instruction may include a command to compile the data into the collective post.

In an embodiment, a non-transitory, computer-readable medium may contain program code that is executable by a processing device. The program code may cause the processing device to perform the following operations: receiving at least one input from each of a plurality of users, directing a storage device to store data corresponding to the at least one input, receiving an instruction from at least one of the plurality of users, and publishing the collective post to the collaborative networking platform as a collective post entry. The at least one input may correspond to one or more interactions between each user and a collective desktop. The instruction may include a command to compile the data into the collective post.

In an embodiment, a method of receiving inputs from a plurality of users for a collective post may include, for each of the plurality of users, receiving, by a processing device, at least one of an input from the user and a digital file. The at least one input may correspond to an interaction between the user and the collective desktop or an interaction between the user and a second user. The method may further include receiving, by the processing device, an instruction from at least one of the plurality of users to create the collective post, compiling, by the processing device, the collective post from the at least one of the input and the digital file, and publishing, by the processing device, the collective post to a collaborative networking platform.

DETAILED DESCRIPTION

Figure 1:
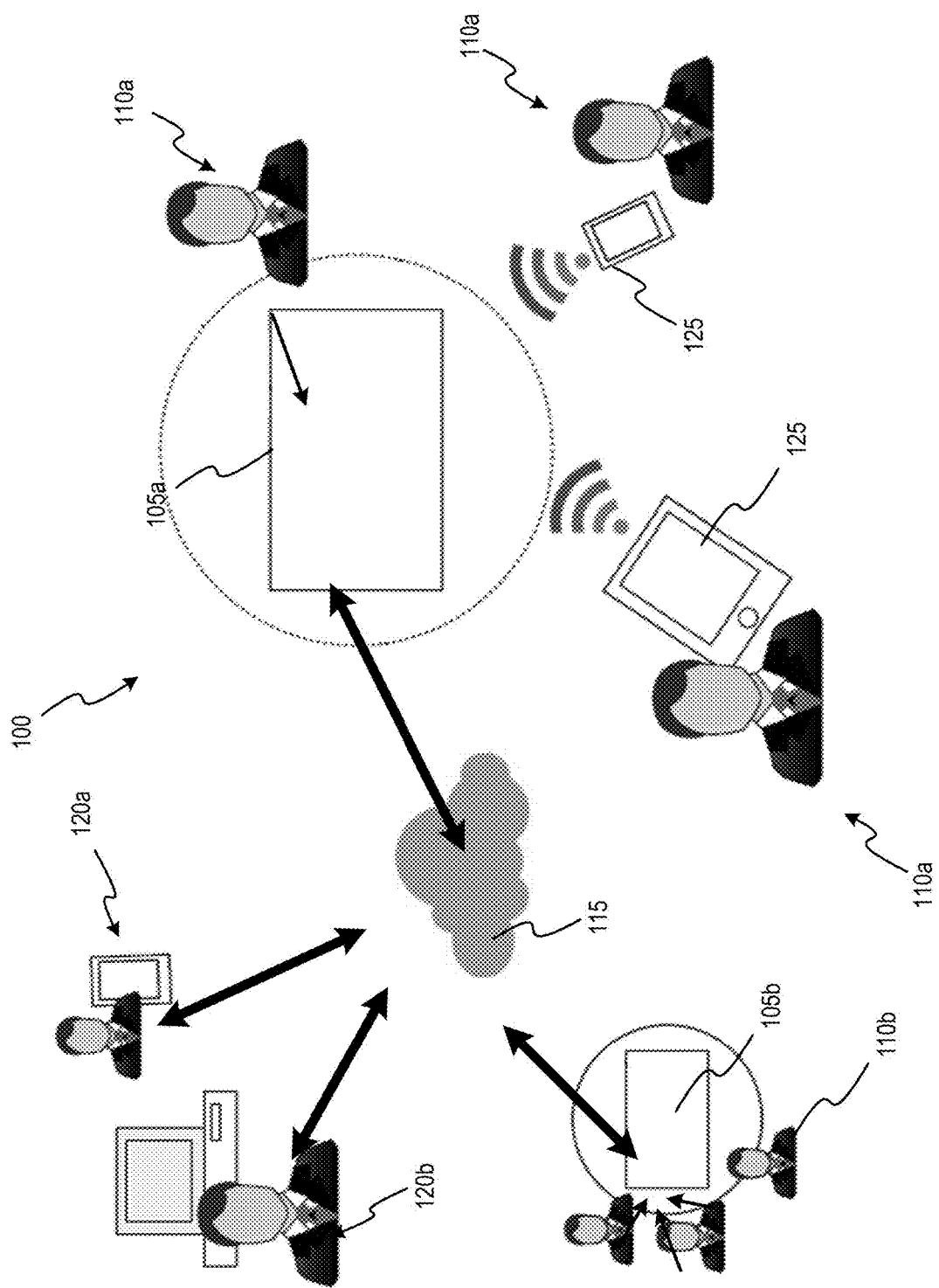
FIG. 1 depicts a schematic diagram of an illustrative system configured to produce a collective post according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "collaborative network" refers to any Internet- or intranet-based community that may identify users by numeric identifiers, names, handles, usernames, email addresses, area codes, telephone numbers, and/or the like. The collaborative network may form a social graph of connectivity of its users in a computer system to identify social relationships. Various users of a collaborative network may make acquaintances via the collaborative network or may make acquaintances via other means and further the acquaintance within the collaborative network. In an organizational network as described herein, the use of the collaborative network enables groups of users to collaborate with each other and to share the fruits of their collaboration with their peers in the form of posts. The posts may be akin to a virtual bulletin board. Thus, various users of the collaborative network that are granted access to a group's posts may view the posts virtually as if he or she was viewing a bulletin board containing the information in the post. In the various embodiments described herein, the collaborative network may be a platform, an interface, and/or the like.

A "collective post," as used herein, generally refers to a post to a collaborative network that is collectively created and edited by a plurality of individuals prior to publication on the collaborative network for other users and groups to view. The post is formed and edited by a plurality of individuals at one or more collective desktop devices and/or one or more electronic devices connected to the one or more collective desktop devices. As a result, the post incorporates various documents, messages, photographs, videos, audio files, recordings of discussions between individuals, interactions between individuals at the one or more collective desktop devices and/or via the one or more electronic devices, and/or the like that have been reviewed and/or edited by at least one group member prior to being finalized and posted to the collaborative network.

As used herein, the term "program code" generally refers to code that is ready for execution (executable code) or code that requires a final compilation or interpretation step before it can be executed (bytecode). In various embodiments, the program code may be contained on a non-transitory, computer-readable medium. A non-transitory, computer-readable medium may include magnetic media, optical media, or other recordable media. The program code may be used to provide software to the system described herein. The program code may further include any number of method processes, as described in greater detail herein.

A "user" is not limited by this disclosure and includes one or more entities or people using any components and/or any elements thereof as described herein. For example, a user can be an employee, a manager, a supervisor, an executive, a researcher, an expert, an administrator, a developer, a group of individuals, and/or the like. In some embodiments, interactions between multiple users may be various users of the same category, such as, for example, multiple employees, multiple managers, multiple supervisors, multiple executives, multiple researchers, multiple experts, multiple administrators, multiple developers, multiple groups, and/or the like. In some embodiments, interactions between multiple users may be various users of differing categories, such as, for example, an employee and a supervisor, a manager and an executive, an employee and an administrator, and/or the like.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include collective desktop devices, personal computers, supercomputers, gaming systems, televisions, mobile devices, medical devices, telescopes, satellites, recording devices, and/or the like.

A "mobile device" refers to an electronic device that is generally portable in size and nature, or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device, or system that performs one or more operations according to one or more programming instructions.

A "user interface" is an interface which allows a user to interact with an electronic device. A user interface may generally provide information or data to the user and/or receive information or data from the user. The user interface may enable input from a user to be received by a computing device and may provide an output to the user from the computing device. Accordingly, the user interface may allow a user to control or manipulate an electronic device and may allow the electronic device to indicate, monitor, and/or record the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, webcam, headset, gear sticks, pedals, wired glove, remote control, and accelerometer are non-limiting examples of user interface components which enable the receiving of information or data from a user.

A "collective desktop" may generally be a user interface that is configured to interface with plurality of users at substantially the same time such that the user interface is a collaborative user interface. However, in some embodiments, a collective desktop may only receive inputs from a single user. As described in greater detail herein, the collective desktop may provide one or more user interface areas for each user that interfaces with the collective desktop. The collective desktop may generally be located at a collective desktop device. The collective desktop device may generally be any electronic device that is configured to provide the collective desktop to one or more users. For example, the collective desktop device may be an electronic tabletop, an electronic coffee table, and/or the like, as described in greater detail herein.

The manner in which an organization governs formal and informal communications between its various employees may define the organization's achievements. When employees are able to cooperate together on projects, information exchange may be broader, thereby allowing ideas to flow in new and unexpected directions that might not otherwise be achieved if employees worked alone. In addition, with the advent of personal electronic devices such as computers, smartphones, and/or the like, the working environment has evolved such that employees can efficiently and effectively search, process, and deliver information related to tasks, projects, and processes.

However, the ability to interact with personal electronic devices may also come at a significant cost. Particularly, such an ability may cause people to rely less on group activities. This decline may be due to a user's ability to complete various tasks on his/her own personal electronic device without interacting with others. Accordingly, a user may perform activities individually without any group cooperation or input. In addition, users may become separated from each other by their own electronic devices and thereby less likely to produce a collaborative effort. Traditional digital networking has further encouraged such separation, which may be due to faster stimuli and/or quicker responses from other users. Digital networking has also increased the multiplicity of information sources, thereby expanding the complexity of possible results and solutions. However, traditional digital networking has not treated the separation of people that has been provoked by the individual electronic device issue described herein.

Accordingly, systems and methods for efficiently obtaining information as a result of structured and/or unstructured meetings may be desirable. Further, systems and methods that increase interpersonal group interactions between users in the digital working environment may also be desirable. In addition, systems and methods that allow users to interact with one another to build and report agreements, decisions, and understanding about tasks and/or common objectives may also be desirable. Such systems and methods may act to increase objectivity, which may result in an improved general performance of people in projects and processes by defeating issues created by individual electronic devices. Such systems and methods may further allow collection, editing, and publication of documents of diverse formats (such as, for example, images, texts, spreadsheets, and/or the like) under the perspective of a shared work experience. For example, a central and unique space may be used to connect all users (for example, through a user's phone, laptop, tablet, and/or the like) locally or remotely to an electronic collaboration space. Accordingly, a plurality of users may interact with each other (in person or remotely), provide documents, provide files, and build a shared group understanding over a single interface, where each user is able to manipulate the interface at substantially the same time as the other users. In addition, methods and/or systems for exchanging information may include identifying a conclusiveness of each collective post, thereby providing a value for its influence on the general course of the work. The valuation is determined through a process of creating context, defining language, increasing engagements, fostering agreements, and delivering transactions.

Accordingly, the systems and methods described herein may allow for a compilation of an evolution of agreements, decisions, and understanding by a plurality of users. The systems and methods may allow users to build a shared knowledge base of solutions, ideas, and other forms of interactions that may occur during a meeting session. For example, a meeting session may be a meeting of employees that are assigned to a particular group, project, and/or the like. The systems and methods may allow for interaction flow and may keep track of all users who took part in that process. As a result, the systems and methods may allow for an understanding and determination of which participants are actively contributing to the organization's business, which may provide data for determining employee performance. In addition, the systems and methods described herein may foster the use of devices in an integrated format that enables participants to avoid an individual electronic device issue by creating a truly shared work experience.

The systems and methods described herein may also provide an entity with an ability to gather individual opinions regarding specific issues and to provide an environment for effective conversation between users by arranging group meetings in a structured format for future review. Such an ability may include an ability to recover knowledge, ideas, proposals, solutions, and agreements made during any group conversation. In some embodiments, the knowledge, ideas, proposals, solutions, and agreements may be used as a seed for additional conversations. In some embodiments, the knowledge, ideas, proposals, solutions, and agreements may foster innovation and conclusiveness. Furthermore, the systems and methods described herein may be implemented within an organization using readily available equipment, thereby allowing organizations to avoid costs that may be typically associated with system upgrades.

As described herein, the systems and methods may result in a hyper-connected human experience beyond the device (s) used by each user, thereby surpassing the individual electronic device issue in the working environment. The systems and methods may further increase the efficiency of group interactions while keeping, evaluating and documenting the information exchange value to amplify conclusiveness of those interactions. A group of users may collaborate on any subject, keeping all important steps and related documents in the process and, at the end, post a message to a collaborative networking platform with the results achieved by the group in the information space of the organization.

In various embodiments, a system may generally include at least one collective desktop device. In particular embodiments, the at least one collective desktop device may be a device that is configured to receive one or more touch inputs from one or more users, such as for example, a touch sensitive device, a touchscreen device, and/or the like. Such devices may receive contact-based inputs from a user, such as from a user's fingers, a stylus, and/or another similar device now known or later developed. Such devices may be adapted for gesture control, thus allowing for a user to tap, pinch, swipe, or provide other similar gestures to elicit commands. Such devices may further be capable of sending touch commands to the at least one computing device. Illustrative examples of such devices may include, but are not limited to, resistive touchscreens, capacitive touchscreens, infrared touchscreens, and/or other technologies now known or later developed. In some embodiments, the at least one user interface device may additionally be configured to receive commands via body gestures, voice, audio signals, device movement, and/or the like. Such commands may be received via one or more of a microphone, a speaker, a camera, a barometer, a gyroscope, and/or the like.

In various embodiments, the collective desktop device may be a worktable or the like that contains at least one computing device and at least one user interface device. Illustrative collective desktop devices may be touchscreen tabletops, such as workbenches, conference tables, desks, coffee tables, and the like containing an interactive surface. In some embodiments, the collective desktop device may be mounted or affixed to a surface, such as, for example, a wall. In some embodiments, the collective desktop device may be an electronic easel, an electronic drawing board, and/or the like. In some embodiments, the collective desktop device may be configured to operate with various software programs or modules, particularly software programs or modules described herein. Illustrative software programs or modules may include, for example, programs or modules that manage each user's login to the system, programs or modules that monitor each user's activity while interacting with the system, programs or modules that determine a location for each user, programs or modules that record items placed into a collective post, modules that act as an interface between the users and a collaborative networking platform such that a collective post can be posted to the collaborative networking platform, modules that provide a collaborative networking platform, and/or the like.

FIG. 1 depicts a schematic diagram of an illustrative system, generally designated 100, according to an embodiment. The system 100 may have at least one collective desktop device 105 that is configured to receive inputs from one or more users 110. In some embodiments, multiple collective desktop devices 105a, 105b may be connected to each other such that a plurality of users 110a, 110b may collaborate in groups via each collective desktop device. For example, a first collective desktop device 105a may receive inputs from one or more first users 110a and may be connected to a second collective desktop device 105b that receives inputs from one or more second users 110b. Such an arrangement may allow the one or more first users 110a to collaborate with the one or more second users 110b in real time as if the users were co-located at a single collective desktop device 105. In some embodiments, the collective desktop devices 105a, 105b may be connected to each other via a direct connection. In other embodiments, the collective desktop devices 105a, 105b may be connected to each other via a network 115. The network 115 may generally be any network between the various collective desktop devices 105a, 105b. For example, the network 115 may be the Internet, an intranet, a wide area network, a metropolitan area network, a local area network, an internet area network, a campus area network, a virtual private network, a personal network, and/or the like. The network 115 may further include a wired network or a wireless network. Those having ordinary skill in the art will recognize various wired and wireless technologies that may be used for the network 115 without departing from the scope of the present disclosure.

Occasionally, a user may find it necessary to connect to a collective desktop device 105, but may not be physically present to interact with the collective desktop device and/or other users. While it may be desirable to avoid such situations for the reasons presented herein, the system 100 may nevertheless allow for a remote user to be connected to at least one collective desktop device 105 via at least one remote electronic device 120a, 120b. The connection between the remote electronic device 120a, 120b and the at least one collective desktop device 105 may be a direct connection or an indirect connection. For example, the remote electronic device 120a, 120b may connect to the collective desktop device 105 via the same network 115 used for the second collaborative user device. Alternatively, the remote electronic device 120a, 120b may connect to the collective desktop device 105 via a different network (not shown). The remote electronic device 120a, 120b is not limited by this disclosure, and may generally include any electronic device. Illustrative remote electronic devices 120a, 120b may include, but are not limited to, personal computers, supercomputers, gaming systems, televisions, mobile devices, medical devices, telescopes, satellites, recording devices, pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and/or the like.

In various embodiments, at least one user 110 may have a personal electronic device 125 with him/her when he/she is at the collective desktop device 105. In some embodiments, the user's personal electronic device 125 may be configured to communicate with the collective desktop device 105. For example, the personal electronic device 125 may be configured to communicate with the collective desktop device 105 such that the collective desktop device can identify the user associated with the personal electronic device, receive login information from the personal electronic device, determine a user's proximity and orientation with respect to the collective desktop device, receive files, documents, pictures, video, text, and/or the like from the personal electronic device, send files, documents, pictures, video, text, and/or the like to the personal electronic device, receive commands from the personal electronic device, send commands to the personal electronic device, and/or the like, as described in greater detail herein. Communication between the collective desktop device 105 and the user's personal electronic device 125 may be wired or wireless. Those having ordinary skill in the art will recognize various wired and wireless technologies that may be used for communication between the collective desktop device 105 and the user's personal electronic device 125 without departing from the scope of the present disclosure.

Since the system 100 allows for a user 110, 120 to connect via a remote electronic device 120a, 120b or at a collective desktop device 105a, 105b, each user may log into the system locally or remotely. In addition, each user may interact with a collective desktop device 105a, 105b, a remote electronic device 120a, 120b, and/or a personal electronic device 125 as a part of a collaboration process, as described in greater detail herein. Illustrative examples of interactions are not limited by this disclosure, and may include, for example, posting information, sending files to the system, editing files, integrating information with other users, and amending other users' files and posts.

As described in greater detail herein, the system 100 may generally be configured to connect a plurality of users, provide an interface for the plurality of users to collaborate together and develop a collective post, monitor and record each user's activity, and provide evidence of each user's activity to certain users. As a process of connecting users, the system 100 may log a registered user 110 into the system by requesting the user enter a username and/or password or by communicating with an electronic device 120, 125 to trigger an application installed on the electronic device to connect with the system. Such an application may automatically process a login and/or connection to the system 100 to allow user interaction, as described in greater detail herein. In some embodiments, the login may be in accordance with one or more security policies and/or access restrictions.

Figure 2:
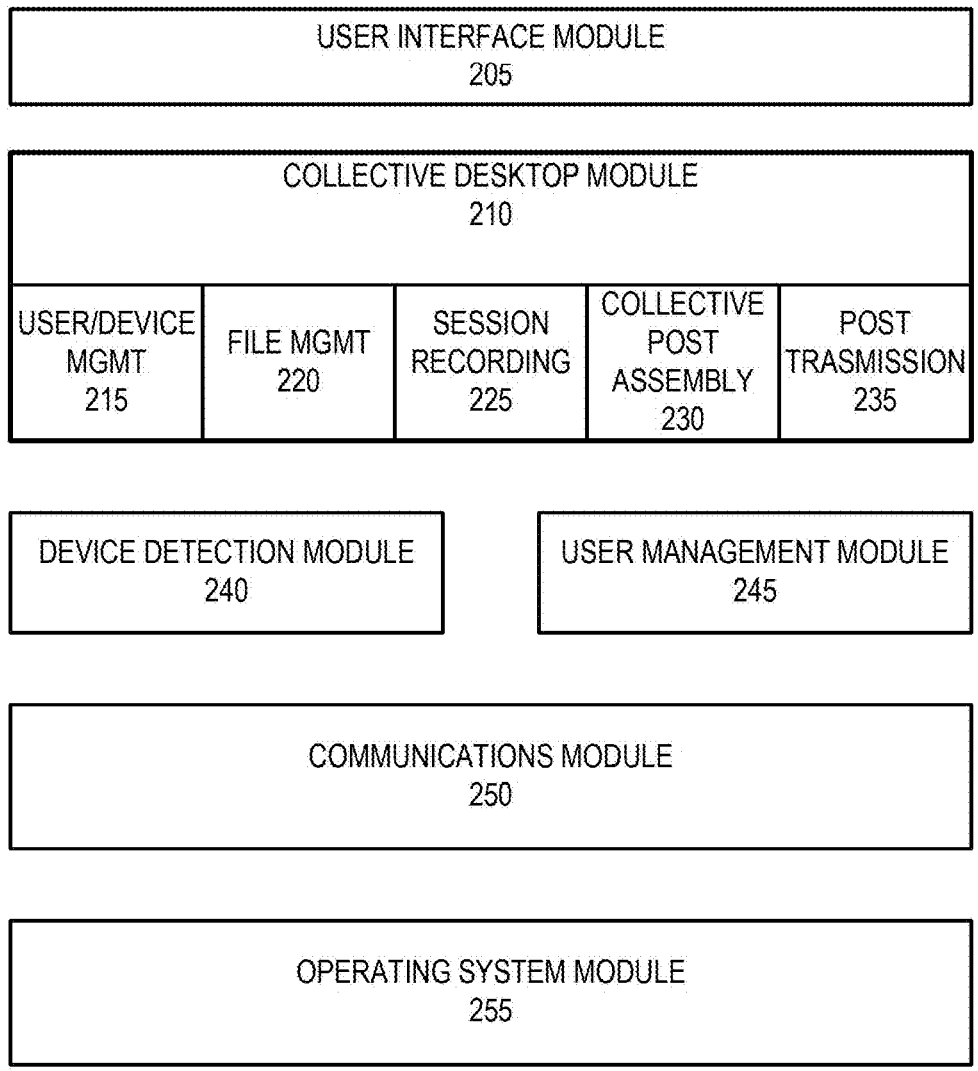
FIG. 2 depicts a block diagram of illustrative modules that may be implemented to produce a collective post according to an embodiment.

FIG. 2 depicts a block diagram of various modules that may be implemented or provided by the system 100 (FIG. 1). For example, the system may provide one or more modules to a user via the collective desktop. In another example, the system may implement one or more modules to monitor or record users' interactions with the collective desktop. Illustrative modules may include, but are not limited to, a user interface module 205, a collective desktop module 210, a device detection module 240, a user management module 245, a communications module 250, and an operating system module 255.

The user interface module 205 may generally present one or more user interfaces to a user. For example, the user interface module 205 may provide a user interface, a shared interface, a remote interface, a collective desktop, and/or the like, as described in greater detail herein. Thus, the user interface module 205 may provide a point of interaction between the system and each of its respective users.

The collective desktop module 210 may generally be configured to monitor and/or record user interaction with the user interface module, manage files and the like, assemble a collective post, and publish a collective post, as described in greater detail herein. In some embodiments, the collective desktop module 210 may include one or more sub-modules for completing each activity. For example, a user/device management sub-module 215 may be configured to manage login of a user and/or an electronic device and connect to a registered user/device database. A file management sub-module 220 may be configured to direct a database to store and/or retrieve electronic files, send electronic files to an electronic device, receive electronic files from an electronic device, and/or the like. A session recording sub-module 225 may generally be configured to record various user interactions with the collective desktop. A collective post assembly sub-module 230 may be configured to arrange a collective post in accordance with users' interactions with each other and the user interface. A post transmission sub-module 235 may be configured to post a finalized collective post to a collaborative network, as described in greater detail herein.

The device detection module 240 may generally detect and/or connect devices to the system. Thus, the device detection module 240 may connect remote electronic devices, local electronic devices, and/or collective desktop devices, as described in greater detail herein. In some embodiments, the device detection module 240 may be configured to log a location of an electronic device during a collaboration session, as described in greater detail herein.

The user management module 245 may generally manage users that are connected to the system. As described in greater detail herein, the users may be remote users or local users. In some embodiments, the user management module 245 may work in conjunction with the user/device management sub-module 215 to manage login of devices and/or users to the system, as described in greater detail herein. In some embodiments, the user management module 245 may monitor and/or track users during a collaboration session, as described herein.

The communications module 250 may generally manage all communications between all electronic devices. For example, the communications module 250 may manage communications between local and remote electronic devices and each collective desktop device, as described in greater detail herein.

The operating system module 255 may provide a base operating system for providing and managing each of the modules described herein. For example, each module may be a software application that runs in an environment provided by the operating system module 255. The operating system module 255 may be configured to provide any operating system now known or later developed, such as, for example, Microsoft® Windows®, Linux®, Apple® Mac OS®, Apple® iOS, Android™, and/or the like.

In various embodiments, the session recording sub-module 225 may allow for the system to log any activity by each of the users whenever at least one user is logged into the system. Thus, when at least one user is logged into the system, any of the users can transmit a file to the system via the file management sub-module 220 or begin interacting with the system, disclosing content and interacting with any or all of the other users via the user interface module 205. During a collaboration session, each user may transmit documents in any file format, such as, for example, text, images, sounds, spreadsheets, or the like that may each be used as a reference for any on-going interaction between users. The documents may generally be transmitted over the same connection that his/her mobile device is connected to the system, as described in greater detail herein. These files may be presented as if they were real objects on a table surface. Each file may be manipulated (for example, enlarged, rotated, annotated, and/or the like) using manipulation tools that are programmed as a portion of the system. Illustrative manipulation tools that may be programmed as a portion of the system may include a text processing tool and/or a voice over Internet protocol (VOIP) tool for audio or videoconferencing that is configured to allow remote users to participate in real-time conversations that can be added to the resulting post. Another illustrative manipulation tool may be a drawing tool that can be used to sketch various images or add drawing layers over text or image files. In some embodiments, a user may use at least a portion of an image and paste the image over a text document to evidence or illustrate an idea. In some embodiments, a user may add a recording (such as a recording of the user's voice or a conversation between users) over a diagram or picture. Accordingly, the system may be configured to record, if needed, any conversations between the various users that are to be added to the collective post. In some embodiments, the recorded conversation may be converted into text via a speech-to-text tool, and may also be edited by the various users prior to the collective post.

Figure 3A:
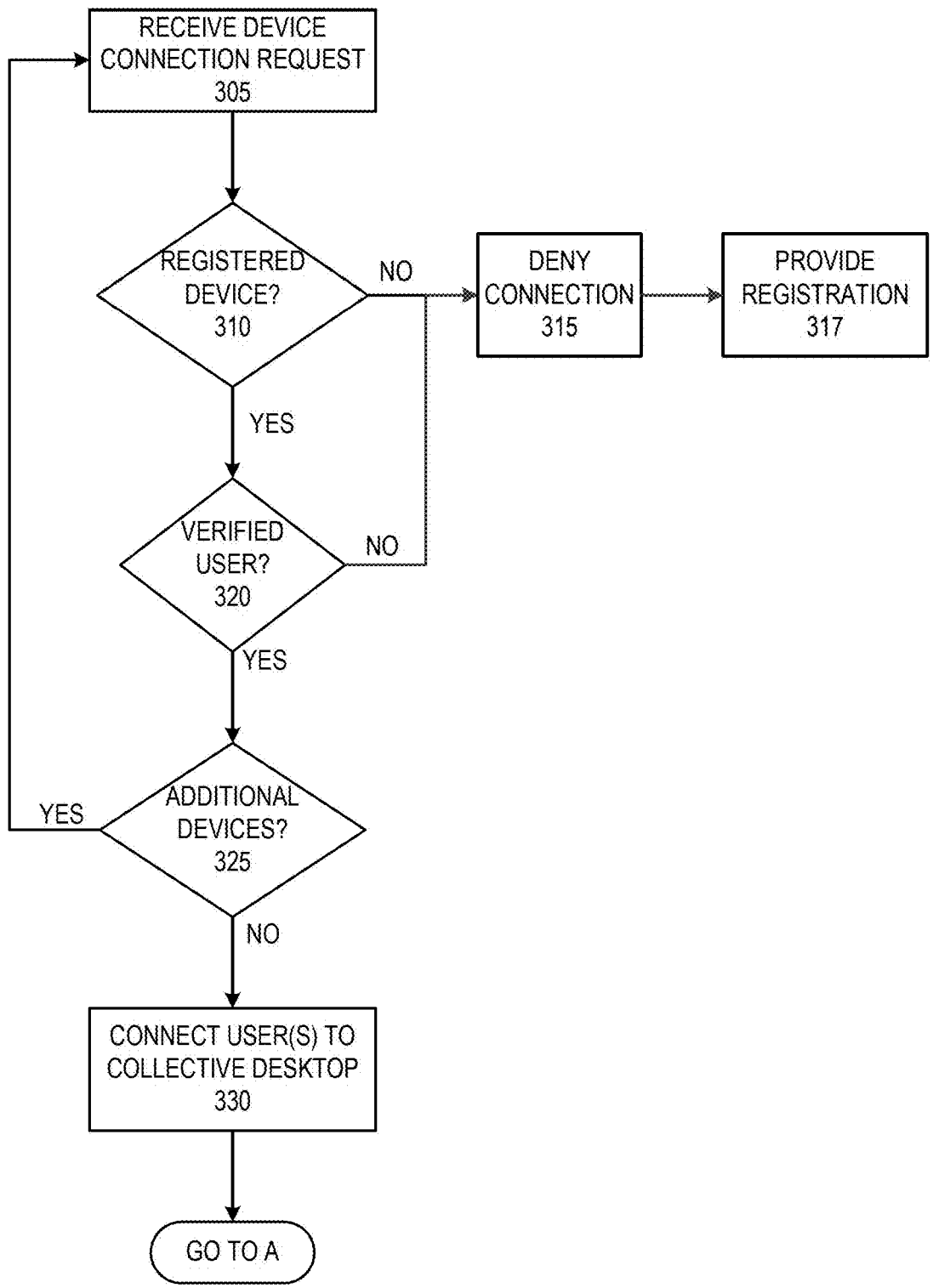
FIG. 3A depicts a flow diagram of an illustrative method of connecting one or more users to a system according to an embodiment.

FIG. 3A depicts a flow diagram of an illustrative method of connecting the system to one or more user devices. As shown in FIG. 3A, the system may receive 305 a device connection request. Such a request may be received 305 automatically, such as when a user activates an application on the electronic device, when a user moves in close proximity to the system, when a user begins interacting with the collective desktop device, and/or the like. The system may determine 310 whether the electronic device and/or a user has been registered. Such a determination 310 may include receiving information from the electronic device regarding the identity of the electronic device and/or the user. For example, the system may receive login information (for example, a user name and/or a password) from an application on the electronic device that indicates a user's identity or may receive other identifying information regarding a user, such as a name, an address, a social security number, a telephone number, an email address, an employee identification number, and/or the like. In another example, the system may receive electronic device identifying information, such as, for example, a media access control (MAC) address, an internet protocol (IP) address, an international mobile equipment identity (IMEI) number, a mobile equipment identifier (MEID) number, a cellular data number (CDN), a serial number, an electronic serial number (ESN), and/or the like. In another example, the system may receive a text entry from a user at the collective desktop device. In some embodiments, the determination 310 may include searching a database or the like to determine whether the information received from the electronic device and/or the user matches information contained in the database or the like. In some embodiments, the database may be used to ensure both the electronic device and the user match the information contained in the database. Such a match may ensure greater security by only allowing certain users and associated electronic devices to connect to the system.

If an electronic device and/or a user are not registered, the system may deny 315 the electronic device from connecting. In some embodiments, the system may provide 317 the user with an opportunity to register. For example, the system may provide 317 a registration webpage, a registration document, and/or the like. If an electronic device and/or a user are registered, the system may determine 320 whether the user is verified. Such a determination 320 may be used, for example, to ensure that the user is authorized to participate in a particular collaboration session. For example, if a particular collaboration session is for executives only, the system may determine 320 that a user that is registered as a mid-level manager is not verified for participation. Thus, the user may be denied 315 from connecting for collaboration. If a user is verified, the system may determine 325 whether any additional devices are to be registered for a collaboration session. If so, the system may return to receive 305 the request for connecting a device. If no additional devices are to be registered, the system may connect 330 the user(s) to the collective desktop to allow the user(s) to interact, as described herein.

Figure 3B:
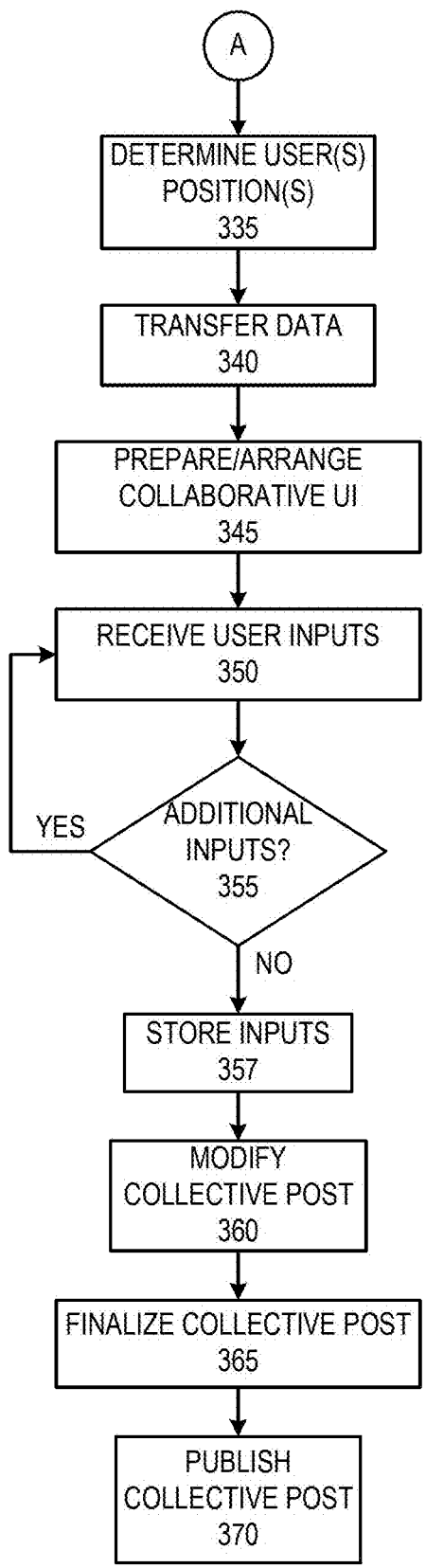
FIG. 3B depicts a flow diagram of an illustrative method for producing a collective post according to an embodiment.

FIG. 3B depicts such an interaction session that is an extension of the registration/connection process described with respect to FIG. 3A. As shown in FIG. 3B, the system may determine 335 a location for each user. Such a determination 335 may generally be completed, for example, such that the system is capable of storing a location for a user, presenting at least a portion of the collective desktop to each user based on the user's location, monitoring and/or recording a user's actions with others and/or the collective desktop, providing data, such as documents, files, images, video, and/or the like to a particular user, determining whether a user is local to the collective desktop device, determining whether a user is connected remotely, and/or the like. Determining 335 each user's location may be performed continuously, intermittently, or once during a collaboration session.

In various embodiments, the system may transfer 340 data between the collective desktop device and the user's personal electronic device. The type of data that is transferred between devices is not limited by this disclosure, and may generally include any data. In some embodiments, the system may transfer 340 data relating to a collaboration project, such as data received from another user. In some embodiments, the system may transfer 340 data relating to various commands, such as positioning commands, commands to activate an application, commands to provide data, and/or the like. Data may be transferred 340 to the system or from the system. Data may be transferred continuously, intermittently, or once during a collaboration session.

In some embodiments, the system may prepare and/or arrange 345 a collective desktop on the collective desktop device and/or a user's personal electronic device. Such a preparation and/or arrangement 345 may generally mark the beginning of a collaboration session between users using the collective desktop device, as described in greater detail herein. As a collaboration session progresses, the system may receive 350 user inputs. In some embodiments, the user inputs may be a direct result of user collaboration. Thus, for example, the received 350 user inputs may include text entry inputs, inputs that include digital files such as documents, photos, video, audio, and/or the like, inputs that correspond to a user's interaction with the collective desktop, inputs that correspond to users' interaction with each other, and/or the like. Inputs that correspond to a user's interaction with the collective desktop are not limited by this disclosure, and may generally include any inputs. For example, inputs may come from a user's finger(s), a stylus, and/or the like. Since the collective desktop device may be a touch sensitive screen, it may be adapted for gesture control, thereby allowing a user to tap, pinch, swipe, or provide similar gestures to elicit commands or inputs. In some embodiments, the system may receive 350 user inputs via body gestures, voice, audio signals, device movement, and/or the like, which may be completed through the use of any number of microphones, speakers, cameras, barometers, gyroscopes, and/or the like. In some embodiments, the system may receive 350 user inputs from one or more input sensors, such as, for example, pressure sensors, motion sensors, environmental sensors, biological sensors, temperature sensors, pressure sensors, optical sensors, health sensors, and/or the like. For example, the system may incorporate a microphone and an optical sensor to receive 350 voice commands and body gestures from a user. Thus, inputs that correspond to users' interactions with each other may be effectively recorded by the system using the various sensors described herein.

From a user's perspective, the system may allow a user to touch the collaborative input device to manipulate uploaded files. Manipulation is not limited by this disclosure, and may include, for example, resizing a document (such as an image), rotating an image to allow other users to view it, clipping a document (such as clipping a movie file or audio file), creating or amending a spreadsheet, creating or amending a text file, and/or the like. The user may complete any of these steps by using various gestures such as, for example, tapping, pinching, swiping, holding, and/or the like. In some embodiments, the user may enter or modify text via an on-screen keyboard, such as a virtual keyboard. The user may also use voice commands, which are recognized by the system and performed accordingly. In some embodiments, the system may include a videoconferencing area, a teleconferencing area, a text messaging area, and/or the like to allow local users to communicate with remote users through the system.

The system may determine 355 whether additional inputs are to be received, such as inputs from other users, additional inputs from a user, and/or the like. Such a determination 355 may be based on previously received inputs that indicate additional inputs are forthcoming, based on whether a user has been requested to provide additional inputs, based on whether a collaborative session has ended or resumed, and/or the like. If additional inputs are to be received, the system may return to receive 350 such inputs. Thus, a collaboration session evolves, each user may attach additional documents, connect to other files for the purpose of making bundles and/or perform other actions, all while the system organizes the conversation by capturing the actions and/or decisions made by the users.

In some embodiments, the system may store 357 the various inputs that have been received 350. In some embodiments, the system may store 357 the inputs as data in a database. The database is not limited by this disclosure, and may generally be any storage device configured to store data. For example, in some embodiments, the system may store 357 the various inputs as data in a cloud-based storage system.

In some embodiments, the system may modify 360 a collective post based upon the received 350 and/or stored 357 inputs. In some embodiments, such a modification 360 may occur after receiving 350 all inputs. In other embodiments, such a modification 360 may occur continuously as each input is received 350 from a user. In some embodiments, modification 360 may include compiling data from inputs that have been received 350. In some embodiments, modification 360 may include receiving a command from a user to create and/or modify a collective post. The system may modify 360 the collective post as many times as necessary per the inputs received 350 from the users and may finalize 365 the collective post once a user has indicated that the post is to be finalized. In some embodiments, such an indication may occur in response to a request. The request may include providing data to a user and receiving a confirmation from the user. In some embodiments, any user may indicate that a post is to be finalized 365. In other embodiments, one or more designated users may indicate that a post is to be finalized 365. In other embodiments, a post may be finalized 365 once the users vote to finalize a collective post. For example, users may vote to finalize, but the system may not finalize 365 the post until receiving a majority vote from the users, a 3/5 vote from the users, a 75% vote from the users, a unanimous vote from the users, and/or the like. Thus, from a user's perspective, at the moment at least one of the users finds the purpose of a session (agreement, decision, understanding) has been achieved, that user may indicate that the collective post is ready to be finalized. The user may find the purpose of a session has been achieved when he or she believes a consensus has been reached to define and conclude the collective post. The consensus may be the cooperative development of a decision that is acceptable enough so that all members of the group agree to support the decision. The consensus may also mean that each and every person involved in the decision has veto power over the other people. In other situations, the collective post can be configured to allow the conclusion decision to be made by a single person or a sub-group of the participants.

In various embodiments, the finalized collective post may be published 370. Publication 370 may include publishing the post to a collaborative network, a message board, a corporate board, and/or the like. In some embodiments, publication 370 of the collective post may include publishing all documents, photos, videos, audio recordings, and/or the like within the collective post. In some embodiments, the collective post may be published 370 in the name of each individual that contributed to the collaboration. In some embodiments, the collective post may be published 370 as a collective post entry.

The collective post that is published 370 may result from a particular collaboration session among various users. Such a publication may allow other people to see which users collaborated, what each user's contribution was to the collaboration, how much a particular user contributed to the collaboration, which ideas were presented and/or modified, and/or the like. Such a publication may be useful, for example, to determine which users deserve recognition for a collaboration, which users deserve a promotion, which users deserve a pay raise, and/or the like. In addition, such a publication may allow for a particular user or group to determine how the various participants interacted with each other as part of the collaboration, comment on the results of the collaboration, provide suggestions, suggest new collaboration topics, and/or the like.

Thus, when a collective post is ready to be finalized, such as when a minimum consensus and agreement has been reached by the group, a user may prepare a final post that contains at least a portion of the results of the collaboration, attachments, relevant documents, conversations, and/or the like. In some embodiments, the system may be configured to compile all of the information collected during the session into the collective post without any additional input from a user. In some embodiments, the system may be configured to receive a text input from a user that provides an abstract of the meeting. The collective post may include all relevant documents, discussions, and/or the like, which may be attached to the collective post as a compressed attachment. Thus, as a result, all collaboration, communication, and uploaded files that were discussed during the session are combined together into a single collective post for posting to a collaborative networking interface. In some embodiments, a user may edit the collection of documents and files produced during the meeting to discard unnecessary files and choose only those that can be considered relevant to the conclusion achieved by the meeting prior to the publication of the collective post. The user may make this choice by manipulating the user interface by dragging and dropping any chosen files, conversations, and/or the like into a "publish post" area on the user interface. Once in the "publish post" area, the post is shown as a template, where each of the users that participated in the session may review the collective post information: the group name, the date of the session, the potential title of the post, pictures of the session participants (co-authors) with links to each user's personal profile, final text, any comments of other users, one or more images, links to previous posts or sessions by the same group of users, all related files collected in the meeting and all related bundles. In some embodiments, it may be necessary to obtain approval by at least one user before the template is posted as a collective post. Illustrative examples of the at least one user may include a user designated as a lead user, a project manager, an administrator, a majority vote of the users who participated in the session, or consensual approval from all users who participated in the session, as previously described herein. Once approval has been obtained, the system may publish the post to a collaborative networking platform. In some embodiments, the template may automatically publish as a post without approval, such as, for example, after a period of time has elapsed.

Figure 3C:
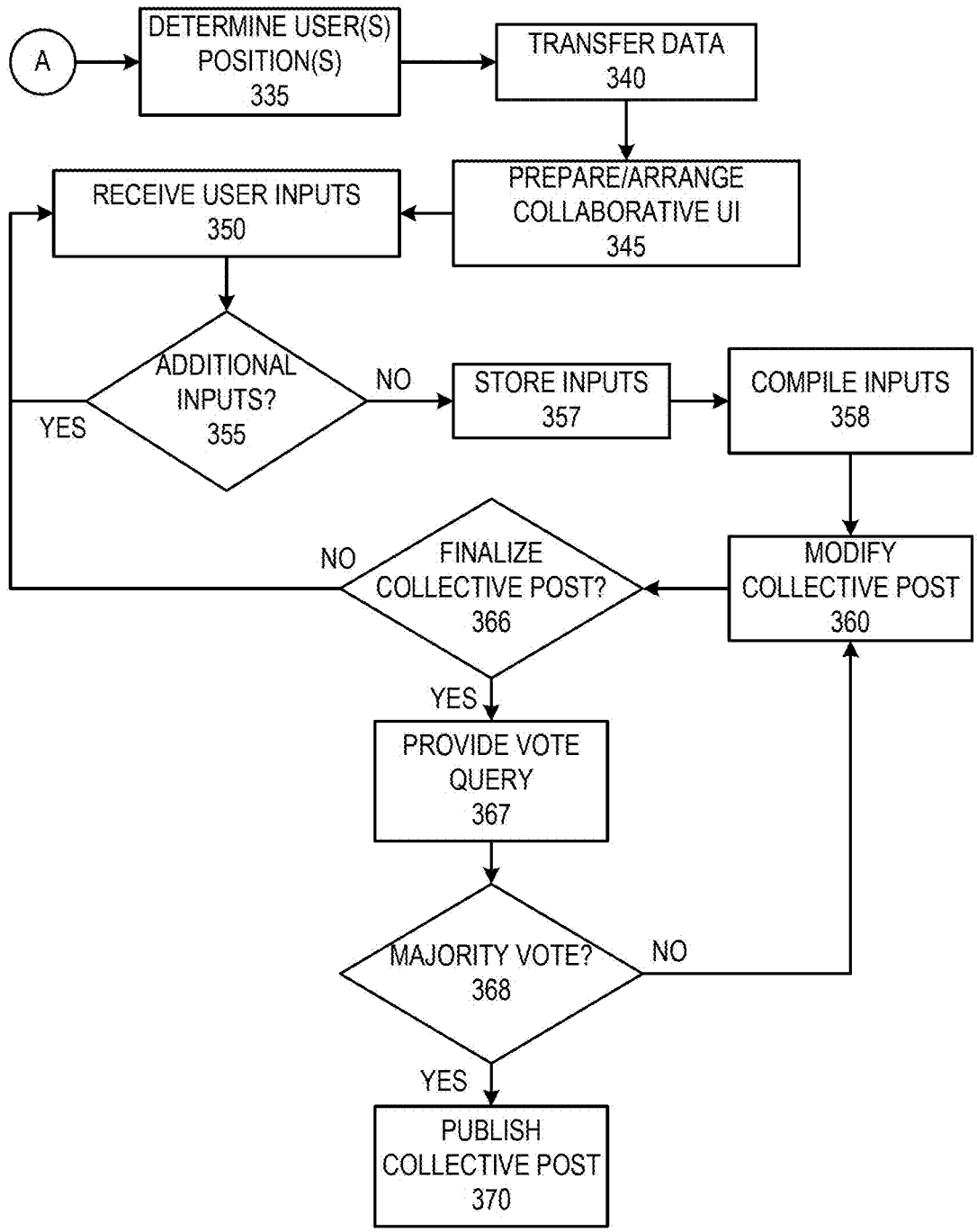
FIG. 3C depicts a flow diagram of an alternative illustrative method for producing a collective post according to an embodiment.

FIG. 3C depicts an alternative embodiment for finalizing a collective post via a voting process according to an embodiment. As shown in FIG. 3C, when the collective post is modified 360, the system may automatically determine 366 whether the post is ready to be finalized. Such a determination 366 may be based on a command from a user to finalize or a determination that no additional inputs are necessary. If the collective post is not ready to be finalized, additional user inputs may be received 350.

If the determination 366 is that the collective post is ready to be finalized, the system may provide 367 a voting query to determine 368 whether the users wish to finalize the collective post. For example, the system may provide 367 each user with a yes/no query box, where each user is prompted to select "yes" or "no" in response to a query whether a post be finalized. If a particular number of users vote to finalize the post, the collective post may be finalized and published 370. If a particular number of users vote not to finalize the post, the system may return to modifying 360 the collective post. In some embodiments, the system may determine 368 that the users wish to finalize the post if a majority (greater than 50%) vote is reached in favor of finalizing the post. In other embodiments, the system may determine 368 that the users wish to finalize the post if a larger number of users vote in favor of finalizing, such as, for example, at least about 67% of the users, at least about 75% of the users, at least about 90% of the users, about 100% of the users, or any value or range between any two of these values (including endpoints). Conversely, the system may determine 368 that the users do not wish to finalize a post if a majority (greater than 50%) vote is reached in favor of not finalizing the post.

Figure 4:
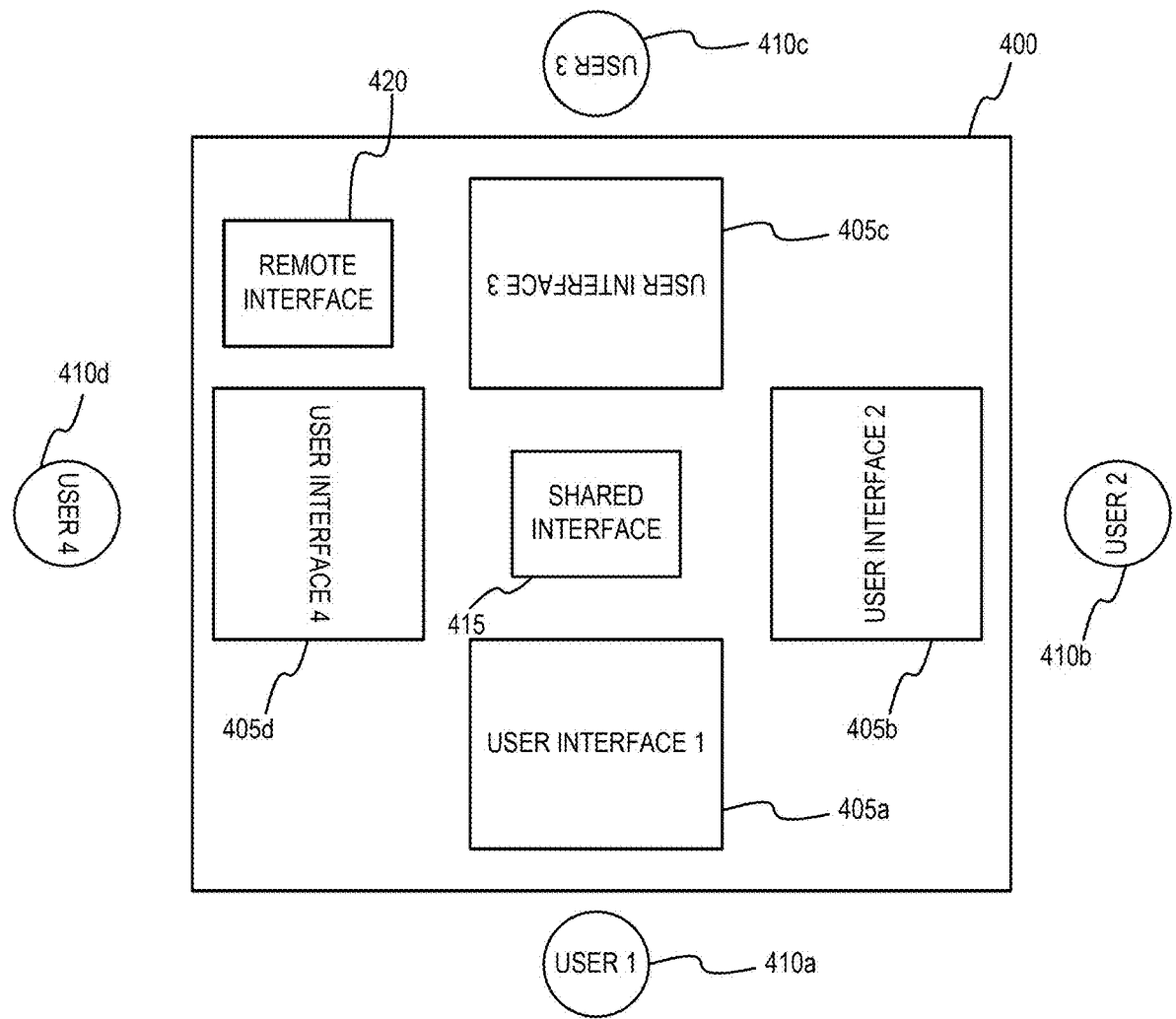
FIG. 4 depicts a graphical diagram of an illustrative collective desktop for a system configured to produce a collective post according to an embodiment.

As shown in FIG. 4, the collective desktop 400 may be presented to at least a first user 410a at a first position adjacent to the collective desktop device. The first user 410a may view a first user interface 405a that is oriented to face the first user. Similarly, a second user 410b, a third user 410c, and a fourth user 410d at second, third, and fourth positions may each have a user interface 405b, 405c, 405d that is respectively oriented towards the user. While FIG. 4 depicts 4 users, a person having ordinary skill in the art will recognize that any number of users may use the collective desktop 400. Thus, the collective desktop 400 may be configured to accommodate 1, 2, 3, 4, 5, 6, 7, 8, 9, 10, 11, 12, 13, 14, 15, or more users. In some embodiments, a plurality of users may use each user interface 405a, 405b, 405c, 405d. For example, the first user interface 405a may be used by 3 users at substantially the same time.

In various embodiments, the system may locate a particular user 410a, 410b, 410c, 410d and his/her position around the user interface device by displaying a position ID and/or the like of the user in a border area (not shown) of the collective desktop 400. In some embodiments, the position ID may be a portion of the respective user interface 405a, 405b, 405c, 405d that organizes the space of the corresponding user 410a, 410b, 410c, 410d on the user interface in a way that is convenient for the user to interact with the user interface. Thus, for example, the position ID may orient various documents, files, and/or the like in a manner that is viewable to the user (i.e., facing the user's position).

In some embodiments, as each user 410a, 410b, 410c, 410d moves with respect to the collective desktop device, the system may monitor the moves and adjust the orientation of the respective user interface 405a, 405b, 405c, 405d, respectively. In other embodiments, the system may provide a particular orientation for each user interface 405a, 405b, 405c, 405d and direct each respective user 410a, 410b, 410c, 410d to move to an assigned user interface. In other embodiments, the system may provide a particular orientation for each user interface 405a, 405b, 405c, 405d and may adjust each user interface such that is corresponds to a user 410a, 410b, 410c, 410d that is positioned at each particular interface.

In various embodiments, each user interface 405a, 405b, 405c, 405d may include any number of controls, applications, and/or the like that allows a user to interact with the collective desktop device, as described in greater detail herein. For example, a user may have access to a personal control pad available that features a user's personal settings and controls that may be useful during a collaborative session for user interaction as described herein. In some embodiments, certain users may have access to certain controls not provided to other users. For example, a manager may have access to certain managerial controls that are not available to individuals working under the manager's purview.

In some embodiments, the system may allow a user 410a, 410b, 410c, 410d to manipulate his/her respective user interface in any number of ways. For example, a user 410a, 410b, 410c, 410d may desire to rotate, zoom, or highlight the user interface 405a, 405b, 405c, 405d in such a manner so that at least a portion of the user interface is visible to other users positioned in other locations around the user interface device. In some embodiments, the system may allow a user 410a, 410b, 410c, 410d to make a gesture to send a portion of his/her respective user interface 405a, 405b, 405c, 405d to another user. For example, a user 410a, 410b, 410c, 410d may desire to send a video to at least one other user, which may be completed by making one or more gestures such as a click, a tap, a flinging motion, and/or the like to effect movement of the video file to the at least one other user.

In various embodiments, the collective desktop 400 may further include a shared interface 415. In some embodiments, the shared interface 415 may be a portion of the collective desktop 400 that is accessible by any of the users 410a, 410b, 410c, 410d using the collective desktop 400. Thus, any user 410a, 410b, 410c, 410d may manipulate the shared interface 415 in a manner similar to his/her respective user interface 405a, 405b, 405c, 405d. In other embodiments, the shared interface 415 may be a portion of the collective desktop 400 that is only accessible to certain users, such as, for example, a project manager user, a collaboration leader, a manager, an executive, and/or the like. In some embodiments, the shared interface 415 may act as a staging area for the collective post. Accordingly, the users 410a, 410b, 410c, 410d may modify the collective post in the shared interface 415 and may decide on a final collective post in the shared interface.

In some embodiments, the collective desktop 400 may include a remote interface area 420 that allows present users to interact with users that are remotely connected. Thus, remote users may be connected to the collective desktop device via a remote connection from the user's mobile device, personal computer, or other system similar to the system described herein. A remotely connected user may be able to interact with the collective desktop 400 via his/her respective electronic device as if he/she was present at the collective desktop device. Accordingly, the user's electronic device may function similar to each user interface 405a, 405b, 405c, 405d described herein. Similarly, the users 410a, 410b, 410c, 410d present at the collective desktop device may be able to view and interact with the remotely connected user's interactions with his/her device at the remote interface 420.

Figure 5:
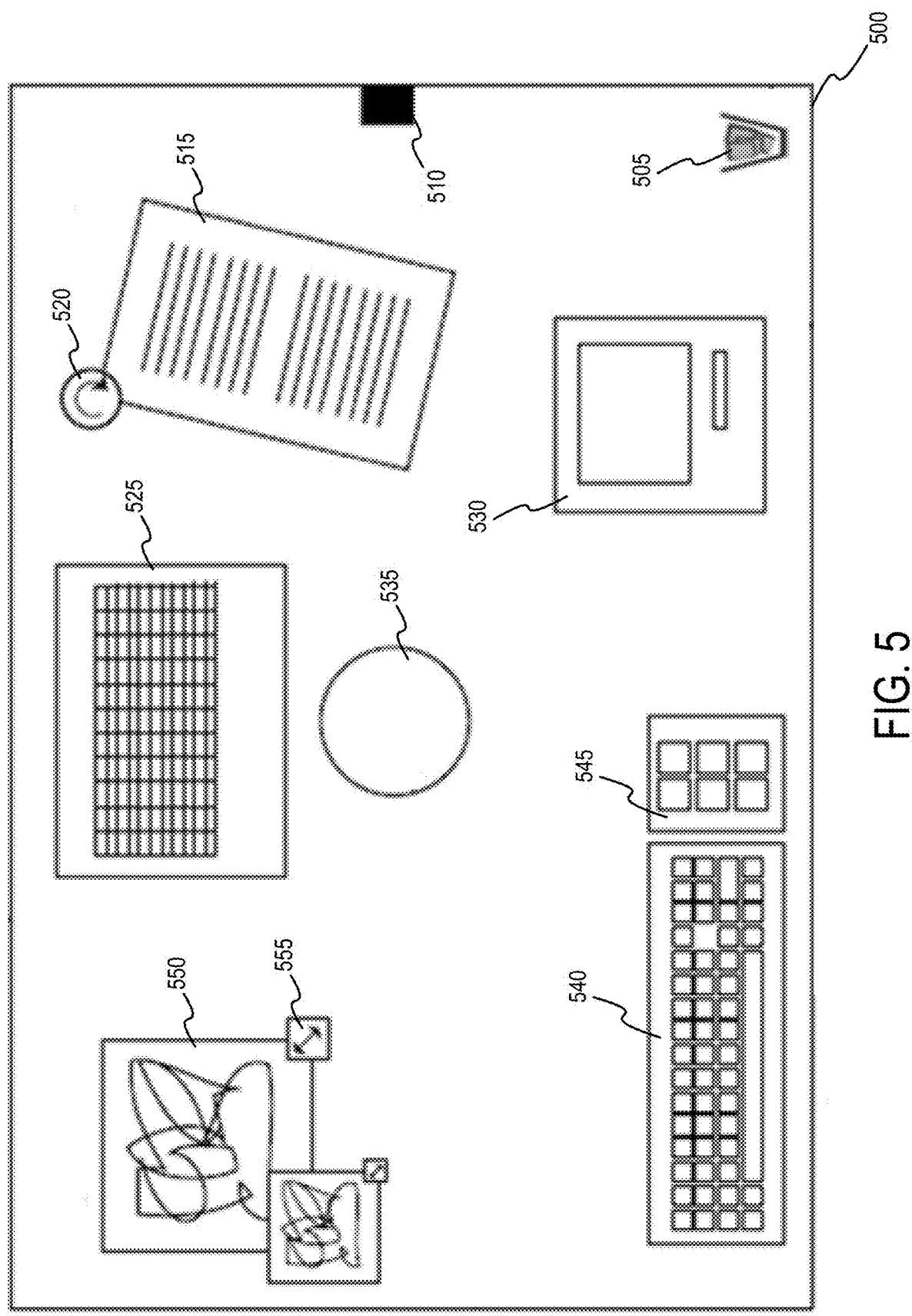
FIG. 5 depicts a graphical diagram of an illustrative collective desktop for a system configured to produce a collective post according to an embodiment.

FIG. 5 depicts an illustrative user interface, generally designated 500, according to an embodiment. Such a user interface may be a portion of the collective desktop 400 (FIG. 4), may be the entire collective desktop, or may be located on a user's personal electronic device, particularly in instances where a user is remotely connected to a collective desktop device. As shown in FIG. 5, the user interface 500 may include, but is not limited to, a trash can 505, a device location marker 510, a text file 515, a manipulation area 520 for the text file, a spreadsheet 525, a videoconference panel 530, a publish post area 535, a virtual keyboard 540, a user personal control pad 545, an image file 550, and a manipulation area 555 for the image file. The trash can 505 may enable a user to dispose of files, documents, images, video clips, audio clips, and/or the like that the user decides are not needed. The device location marker 510 may provide an on-screen indicator of the location of a user's electronic device, such as a local electronic device or a remote electronic device, as described in greater detail herein. The text file 515 may be, for example, a display of a text document that can be edited by a user. The manipulation area 520 may allow a user to manipulate a view on the text file, such as, for example, to rotate the text file for other users to view, as described in greater detail herein. The spreadsheet 525, similar to the text file 515, may be a display of a document that can be edited by a user. The videoconference panel 530 may generally be used for communicating with remote users. The publish post area 535 may be an area where a user can place documents, files, images, video, audio, and the like for addition to the collaborative post. In some embodiments, the publish post area 535 may be a portion of the shared interface 415 (FIG. 4). In other embodiments, the publish post area 535 may direct data to the shared interface 415 (FIG. 4). In some embodiments, a user may manipulate the various other items, type text, and/or the like via the virtual keyboard 540 and/or the user personal control pad 545. Similar to the spreadsheet 525 and the text file 515, the image file 550 may be a display of an image, video, or the like that can be edited by the user. Accordingly, a user may use the manipulation area 555 to manipulate the image, such as to zoom, crop, rotate, resize, and/or the like.

Figure 6:
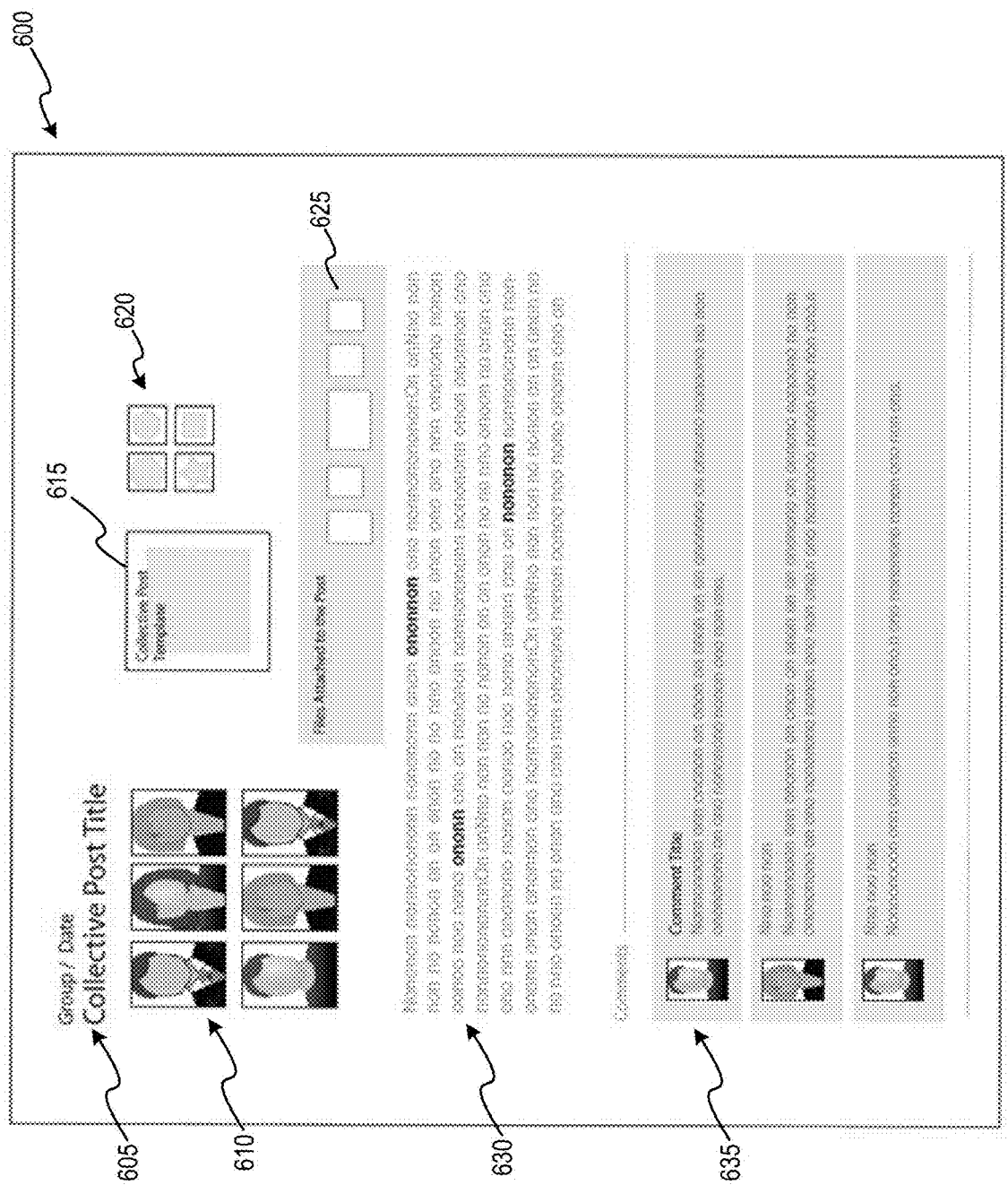
FIG. 6 depicts an illustrative collective post according to an embodiment.

FIG. 6 depicts an illustrative collective post, generally designated 600, created via the systems and methods described in greater detail herein. The collective post 600 may be related to any topic and may contain any component. Illustrative collective post 600 components may include, but are not limited to, a title 605, pictures and/or names 610 of contributors to the collective post, an icon or image representing the collective post 615, one or more indicators of content types 620, one or more files, documents, images, videos, audio clips, and/or the like 625 attached to the collective post, and text 630. Once a collective post 600 has been published as described herein, one or more users (or groups of users) may provide comments 635 on the collective post. In some embodiments, the comments 635 may lead to additional discussion regarding the collective post 600, may spawn additional collective posts, and/or the like.

Figure 7:
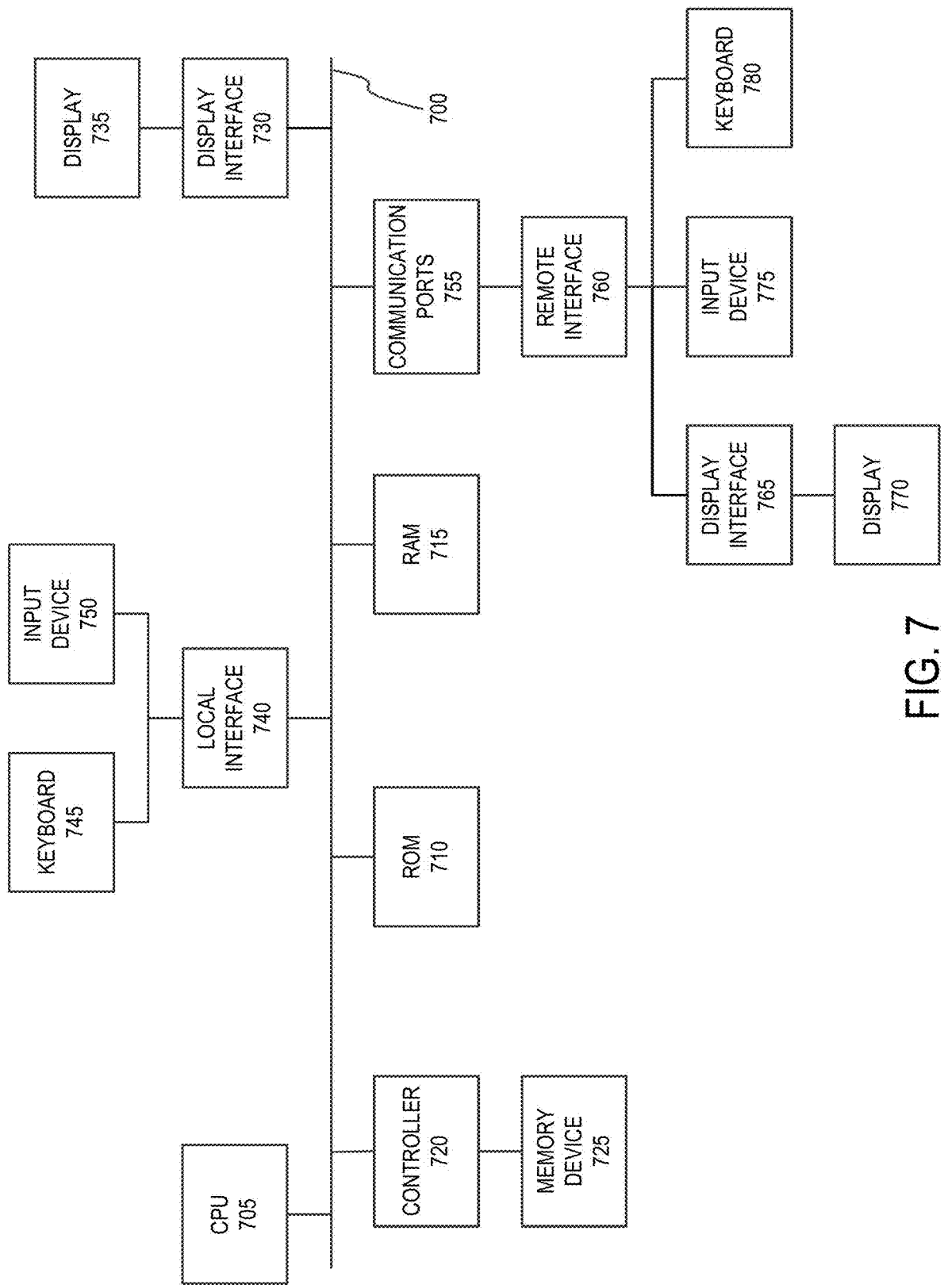
FIG. 7 depicts a block diagram of illustrative internal hardware that may be used to contain or implement program instructions according to an embodiment.

FIG. 7 depicts a block diagram of illustrative internal hardware that may be used to contain or implement program instructions, such as the process steps discussed herein in reference to FIGS. 3A and 3B or the modules discussed herein in reference to FIG. 2, according to embodiments. A bus 700 may serve as the main information highway interconnecting the other illustrated components of the hardware. CPU 705 may be the central processing unit of the system, performing calculations and logic operations required to execute a program. The CPU 705, alone or in conjunction with one or more of the other elements disclosed in FIG. 7, is an illustrative processing device, computing device or processor as such terms are used within this disclosure. Read only memory (ROM) 710 and random access memory (RAM) 715 may constitute illustrative memory devices (i.e., processor-readable non-transitory storage media).

A controller 720 may interface with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 730 may permit information from the bus 700 to be displayed on the display 735 in audio, visual, graphic or alphanumeric format.

Communication with external devices, particularly the remote users as described herein, may occur using various communication ports 755. An illustrative communication port 755 may be attached to a communications network, such as the Internet or an intranet. The communication ports 755 may further be attached to a remote interface 760 that allows the receipt of data from input devices such as a keyboard 780 or other input device 775 such as a mouse, a joystick, a touch screen, a remote control, a pointing device, a video input device and/or an audio input device. The remote interface 760 may further be configured to transmit display information to a second display interface 765, which may permit that information to be displayed on a second display 770 in audio, visual, graphic or alphanumeric format.

The hardware may also include a local interface 740 which allows for receipt of data from input devices such as a keyboard 745 or other input device 750 such as a mouse, a joystick, a touch screen, a remote, and/or the like, as described in greater detail herein.

EXAMPLES

Example 1: Collective Post System

A system for producing a collective post includes a processor and a non-transitory, processor-readable storage medium in communication with the processor. The system is a table-mounted computing device that is configured to receive touch inputs from a plurality of users at substantially the same time. The non-transitory, processor-readable storage medium is encoded with one or more programming instructions. The programming instructions, when executed, cause the processor to complete a plurality of processes. The plurality of processes include simultaneously providing permission to a plurality of users to input and receive data at the table-mounted touchscreen. The permission includes allowing each user to input text, upload digital files, amend other users' documents and text entries, and communicate with other users by recording users' conversation via voice recording and text message recording on the table-mounted touchscreen. The plurality of processes also includes directing a storage device to monitor and store the data inputted by the users. The storage device is a cloud-based storage medium that is operatively connected to the system. Once the users have completed their interaction and agreed upon a finalized collective post, the plurality of processes include receiving an instruction from at least one of the users that the data is a complete post and ready for finalization and uploading to a collaborative network. The plurality of processes also includes posting the complete post to the collaborative networking platform as a collective post entry once it has been finalized by the users.

Example 2: Method for Implementing Via Computing Device

A method for producing a collective post includes one or more processes. Each of the processes described herein is completed by a processing device. The processes include simultaneously providing permission to each of a plurality of users to input data, directing a storage device to store the data inputted by the users, receiving an instruction from at least one of the users, and posting the complete post to the collaborative networking platform as a collective post entry. As previously described herein, the instruction includes a notification that the data is a complete post to be posted to a collaborative networking platform. The method is included as program code in a non-transitory, computer-readable medium containing program code.

Example 3: Method of Receiving Inputs from a Plurality of Users

A method of receiving inputs from a plurality of users includes one or more processes. Each of the processes described herein is completed by a processing device. The processes include directing a sensor to detect at least one user-associated electronic device. The user-associated electronic device, when detected, is indicative of a user's presence at a collective desktop device. The processes also include receiving one or more interactions between each user and a collective desktop portion of the collective desktop device, receiving one or more digital files from at least one user-associated electronic device, and receiving an instruction from a user to finalize a collective post. The processes also include compiling the one or more interactions and the one or more digital files to create a collective post and publishing the collective post to a collaborative networking platform.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for producing a collective post, the system comprising:
   a processing device; and
   a non-transitory, processor-readable storage medium in communication with the processing device, wherein the non-transitory, processor-readable storage medium contains one or more programming instructions that, when executed, cause the processing device to:
   receive login and locational information from each of a plurality of users;
   create a social graph of connectivity of each of the plurality of users;
   determine, based on the login, the social graph, and the locational information, a user access level;
   accept, based on the user access level, input from each of the plurality of users, wherein the input corresponds to one or more interactions between each user and a collective desktop;
   track a location of the input from each of the plurality of users relative to the collective desktop, wherein each input has a known user and each user has a known login and the determined user access level;
   determine, based on the tracking, whether the input was received in a user-specific workspace;
   direct a storage device to store data corresponding to the input;
   receive an instruction from at least one of the plurality of users, wherein the instruction comprises a command to compile the data into the collective post;
   obtain voting information from each of the plurality of users; and
   publish the collective post comprising one or more of a location of each of the plurality of users, a photograph, and an audio file to a collaborative networking platform as a collective post entry based on the voting information, wherein the collective post comprises a record of a collaboration between the plurality of users.

2. The system of claim 1, further comprising one or more programming instructions that, when executed, cause the processing device to:
   compile the data into the collective post;
   provide the collective post to each of the plurality of users; and
   receive a confirmation instruction from at least one of the plurality of users prior to publishing the collective post to the collaborative networking platform.

3. The system of claim 1, wherein the data comprises at least one of a digital file, a recorded conversation, and text.

4. The system of claim 1, wherein the data comprises at least one digital file comprising a document, a spreadsheet, a video file, or the audio file.

5. The system of claim 1, wherein the system is a table-mounted collective desktop device configured to interact with at least a first user and a second user at the same time.

6. The system of claim 1, wherein the accepted input from each of the plurality of users further comprises at least one of the following:
   a touch screen entry from a user;
   a text entry from a user;
   an audio recording of a conversation between a first user and a second user;
   a video recording of a conversation between a first user and a second user; and
   a digital file transfer from a user's electronic device.

7. A method for producing a collective post, the method comprising:
   receiving, by a processing device, login and locational information from each of a plurality of users;
   creating, by the processing device, a social graph of connectivity of each of the plurality of users;
   determining, based on the login, the social graph, and the locational information, a user access level;
   accepting, based on the user access level, input from each of the plurality of users, wherein the input corresponds to one or more interactions between each user and a collective desktop;
   tracking, by the processor, a location of the input from each of the plurality of users relative to the collective desktop, wherein each input has a known user and each user has a known login and the determined user access level;
   determining, based on the tracking, whether the input was received in a user-specific workspace;
   directing, by the processing device, a storage device to store data corresponding to the input;
   receiving, by the processing device, an instruction from at least one of the plurality of users, wherein the instruction comprises a command to compile the data into the collective post;
   obtaining voting information from each of the plurality of users; and
   publishing, by the processing device, the collective post comprising one or more of a location of each of the plurality of users, a photograph, and an audio file to a collaborative networking platform as a collective post entry based on the voting information, wherein the collective post comprises a record of a collaboration between the plurality of users.

8. The method of claim 7, further comprising:
   compiling, by the processing device, the data into the collective post;
   providing, by the processing device, the collective post to each of the plurality of users; and
   receiving, by the processing device, a confirmation instruction from at least one of the plurality of users prior to publishing the collective post to the collaborative networking platform.

9. The method of claim 7, wherein the data comprises at least one of a digital file, a recorded conversation, and text.

10. The method of claim 7, wherein the data comprises at least one digital file comprising a document, a spreadsheet, an image file, a video file, or the audio file.

11. The method of claim 7, wherein the accepting input from each of the plurality of users further comprises accepting at least one of the following:
   a touch screen entry from a user;
   a text entry from a user;
   an audio recording of a conversation between a first user and a second user;
   a video recording of a conversation between a first user and a second user; and
   a digital file transfer from a user's electronic device.

12. A non-transitory, computer-readable medium containing program code that is executable by a processing device to perform operations comprising:
- receive login and locational information from each of a plurality of users;
- create a social graph of connectivity of each of the plurality of users;
- determine, based on the login, the social graph, and the locational information, a user access level;
- accept, based on the user access level, input from each of the plurality of users, wherein each input corresponds to one or more interactions between each user and a collective desktop;
- track location of the input from each of the plurality of users relative to the collective desktop, wherein each input has a known user and each user has a known login and the determined user access level;
- determine, based on the tracking, whether the input was received in a user-specific workspace;
- direct a storage device to store data corresponding to each input;
- receive an instruction from at least one of the plurality of users, wherein the instruction comprises a command to compile the data into a collective post;
- obtain voting information from each of the plurality of users; and
- publish the collective post comprising one or more of a location of each of the plurality of users, a photograph, and an audio file to a collaborative networking platform as a collective post entry based on the voting information, wherein the collective post comprises a record of a collaboration between the plurality of users.

13. The non-transitory, computer-readable medium of claim 12, wherein the program code that is executable by the processing device to perform operations further comprising:
- compile the data into the collective post; and
- provide the collective post to each of the plurality of users;
- receive a confirmation instruction from at least one of the plurality of users prior to publishing the collective post to the collaborative networking platform.

* * * * *